Patented Nov. 17, 1925.

1,562,041

UNITED STATES PATENT OFFICE.

ALADAR PACZ, OF CLEVELAND, OHIO, ASSIGNOR TO GENERAL ELECTRIC COMPANY, A CORPORATION OF NEW YORK.

METAL AND ITS MANUFACTURE.

No Drawing. Application filed September 26, 1918, Serial No. 255,790. Renewed April 7, 1925.

*To all whom it may concern:*

Be it known that I, ALADAR PACZ, a citizen of the United States, residing at Cleveland, in the county of Cuyahoga, State of Ohio, have invented certain new and useful Improvements in Metals and Their Manufacture, of which the following is a specification.

My invention relates to improvements in aluminothermic and like methods of reducing metals from compounds thereof. While my invention is of general application wherever the aluminothermic and like methods may be employed, it is particularly applicable to the production of metals having a comparatively high melting point. Some such metals are zirconium, titanium, vanadium, tantalum, molybdenum, tungsten, chromium, manganese, cobalt and nickel and alloys of these metals with each other and with iron, nickel and other metals with which the aforenamed are commonly alloyed.

The aluminothermic process as now practiced for the reduction of metals and the formation of alloys consists in mixing together and placing in a suitable crucible the compounds, usually oxides, of the metals in a finely divided condition with finely divided aluminum and starting the ignition by means of a small quantity of a special ignition mixture in contact with the main mixture such as finely divided magnesium with an oxidizing agent such as barium peroxide, the ignition being communicated to the rest of the mass.

My improvement consists, among other things, in a change in the method of bringing together and igniting the mixture of the aluminum or like reagent and the compounds of the metals to be reduced and, incidentally, in dispensing with the use of a special ignition mixture.

According to my invention briquettes are made containing a very intimate mixture of the metal compounds and finely divided aluminum or like material. Although these briquettes preferably contain a suitable binder, they may be consolidated simply by compression.

In the aluminothermic method as now practiced, the aluminum used is of the granulated variety and runs from 20 to 60 mesh. According to my invention, a finer aluminum is used which is preferably produced by the blowing process and runs from 80 to 200 mesh or over. With this I mix a small quantity, preferably 10% or more, of finely divided flaky aluminum such as is ordinarily used for aluminum paint. This is preferably from 60 to 200 mesh although these limits are not absolute. This is a matter which can be determined by trial, and it is desirable to reduce as much as possible the quantity of flaky aluminum used on account of its being comparatively expensive. I have found that briquettes made in this way may be readily ignited without requiring a special ignition mixture.

The operation is started by igniting one or more of the briquettes by means preferably of a concentrated flame such as that of a blast lamp. As many other briquettes may then be fed into the crucible as are necessary to produce the desired quantity of metal or alloy. The metal reduced collects in a molten mass at the bottom of the crucible.

One example of the application of my invention is the production of ferro-zirconium or ferro-silico-zirconium. These alloys are difficult to produce free from carbon on account of their high melting point and also the susceptibility of the zirconium to oxidation. My invention is of real advantage since the more intimate association of the materials obtained by means of the briquette method as compared with the loose mixture method now practiced, causes a greater localization of the heat and a greater fluidity of the metal. Moreover, air is much more effectively excluded according to my invention and a purer product therefore obtained. In one case I made up briquettes consisting of about 32 parts ferric oxide, 36 parts zirkite (a natural zirconium oxide consisting of a mixture of Brazilite and other zirconium minerals and having a zirconium oxide content of about 80% and silica of about 8%), 22 parts of finely divided aluminum consisting of about 90% of 80 to 200 mesh blown variety and about 10% flaky variety, such as is ordinarily used for aluminum paint, running about 60 to 200 mesh. Sufficient sodium silicate was added to bind the material of the briquette together. In order to dry the briquette thoroughly it was heated to approximately 400° to 500° centigrade. This probably had the beneficial result, besides drying, of forming a sort of glass which was thoroughly disseminated through the briquette. One or more of these briquettes were then placed in a crucible and ignited by means of a blast lamp, after which briquettes were added (one or more at a time) to maintain the ignition and add to the quantity of molten alloy collecting at the bottom of the crucible. The result was the formation of a large slug of the alloy consisting of ferro-zirconium containing a small amount of silicon produced from the silica contained in the zirkite and from the binder. The byproduct was slag containing aluminum oxide and some zirkite. This material can be utilized as an abrasive.

I have utilized a ferro zirconium or ferro-silico-zirconium alloy produced as above described in the manufacture of steel of superior qualities. It is probable that the superior results secured were due to the fact that this alloy is more soluble in the molten steel bath than the alloys heretofore produced. At least this alloy seemed to be taken up more quickly and in a greater quantity by the steel. The greater freedom of my alloy from impurities such as oxides due to the presence of air at the time of formation and also the presence of a certain amount of silicon which probably prepared the way for the action of the zirconium may serve as an explanation of the good results achieved. Chromium and other metals may be included in an alloy by including their oxides in briquettes.

What I claim as new and desire to secure by Letters Patent of the United States, is:—

1. The method of reducing one or more metals from compounds thereof which consists in briquetting said compounds intimately mixed with finely divided aluminum above 80 mesh, and igniting one or more of the briquettes.

2. The method of reducing one or more metals from compounds thereof which consists in briquetting said compounds with a finely divided metallic reducing agent, a portion at least of which is in the flaky condition, and igniting one or more of the briquettes.

3. The method of reducing one or more metals from compounds thereof which consists in briquetting said compounds with finely divided aluminum, a portion at least of which is in the flaky condition and igniting one or more of the briquettes.

4. The method of producing zirconium alloys which consists in forming briquettes containing an oxygen containing compound of zirconium intimately mixed with a finely divided metallic reducing agent above 80 mesh and then igniting one or more of the briquettes.

5. The method of producing zirconium alloys which consists in forming briquettes containing zirconium oxide intimately mixed with finely divided aluminum above 80 mesh and then igniting one or more of the briquettes.

6. The method of producing iron zirconium alloys which consists in forming briquettes containing iron and zirconium oxides and finely divided aluminum above 80 mesh, and then igniting one or more of the briquettes.

7. A briquette comprising a finely divided compound of a metal to be reduced intimately mixed with a finely divided metallic reducing agent, a portion at least of which is in the flaky condition.

8. A briquette comprising a finely divided compound of a metal to be reduced intimately mixed with finely divided aluminum, a portion at least of which is in the flaky condition.

9. The method of reducing one or more metals from compounds thereof which consists in briquetting said compounds with aluminum of the blown variety, igniting in a suitable container a small quantity of a mixture containing flaky aluminum and then adding the aforesaid briquettes as needed to furnish the desired amount of metal.

10. The method of reducing a metal from a compound thereof which consists in briquetting said compound in a finely divided condition intimately mixed with aluminum of materially greater fineness than 60 mesh, igniting in a suitable container a small quantity of a mixture of flaky aluminum with an oxygen bearing compound and then adding the aforesaid briquettes as needed to furish the desired amount of metal.

11. The method of producing a metal or alloy which consists in intimately mixing an oxide of the metal or alloy with finely divided aluminum of materially greater fineness than 60 mesh, forming the said mixture into briquettes, producing in a suitable container a temperature sufficient to cause a reaction between the said materials and then adding the briquettes in sufficient quantity to produce the desired amount of metal.

12. The method of producing a metal or alloy which consists in intimately mixing a compound of the metal with finely divided aluminum without additional ignition material, forming the said mixture into briquettes, igniting one or more of the briquettes by applying a flame thereto in a container to start the reaction, and then feeding briquettes to the container to produce the amount of metal desired.

In witness whereof, I have hereunto set my hand this twenty third day of September 1918.

ALADAR PACZ.